(12) United States Patent
Naples

(10) Patent No.: US 9,604,700 B2
(45) Date of Patent: Mar. 28, 2017

(54) WAKE MODIFYING DEVICE FOR ATTACHMENT TO A STERN MOUNTED PLATFORM

(71) Applicant: Steven Scott Naples, Anaheim, CA (US)

(72) Inventor: Steven Scott Naples, Anaheim, CA (US)

( * ) Notice: Subject to any disclaimer, the term of this patent is extended or adjusted under 35 U.S.C. 154(b) by 0 days.

(21) Appl. No.: 15/012,789

(22) Filed: Feb. 1, 2016

(65) Prior Publication Data

US 2016/0221642 A1    Aug. 4, 2016

Related U.S. Application Data

(60) Provisional application No. 62/110,167, filed on Jan. 30, 2015.

(51) Int. Cl.
*B63B 1/22* (2006.01)
*B63B 1/32* (2006.01)
*B63B 35/85* (2006.01)

(52) U.S. Cl.
CPC .................. *B63B 1/22* (2013.01); *B63B 1/32* (2013.01); *B63B 2035/855* (2013.01)

(58) Field of Classification Search
CPC  B63B 1/28; B63B 1/286; B63B 35/85; B63B 1/20; B63B 1/22; B63B 1/32; B63B 39/00; B63B 39/06

USPC .................................. 114/271, 284, 285, 286
See application file for complete search history.

(56) References Cited

U.S. PATENT DOCUMENTS

| | | | |
|---|---|---|---|
| 6,095,077 A * | 8/2000 | DeAgro | B63B 39/005 114/285 |
| 8,534,214 B1 | 9/2013 | Gasper | |
| 8,539,897 B1 | 9/2013 | Gasper et al. | |
| 8,578,873 B2 | 11/2013 | Gasper et al. | |
| 9,038,560 B1 * | 5/2015 | Brendel | B63B 35/73 114/284 |
| 9,199,695 B2 | 12/2015 | Gasper et al. | |
| 9,260,161 B2 | 2/2016 | Gasper et al. | |
| 9,334,022 B2 | 5/2016 | Gasper et al. | |

* cited by examiner

*Primary Examiner* — Lars A Olson
(74) *Attorney, Agent, or Firm* — Myers Berstein LLP

(57) ABSTRACT

The present invention provides a detachable wake modifying device that can be placed on either the port or starboard side of a boat platform due to the reversible design of the mount and its attachment to the remainder of the wake assembly. The mount has an open channel design that receives a lateral adjustment arm. An angular adjustment arm hinges between the lateral adjustment arm and the wake tab. The wake tab also hinges to the lateral adjustment arm, forming a triangular structure between the wake tab, lateral adjustment arm, and the angular adjustment arm. In this way, the angle of the wake tab can be adjusted to create a desirable wake in the water behind a motor boat, which is suitable for wake surfing.

19 Claims, 12 Drawing Sheets

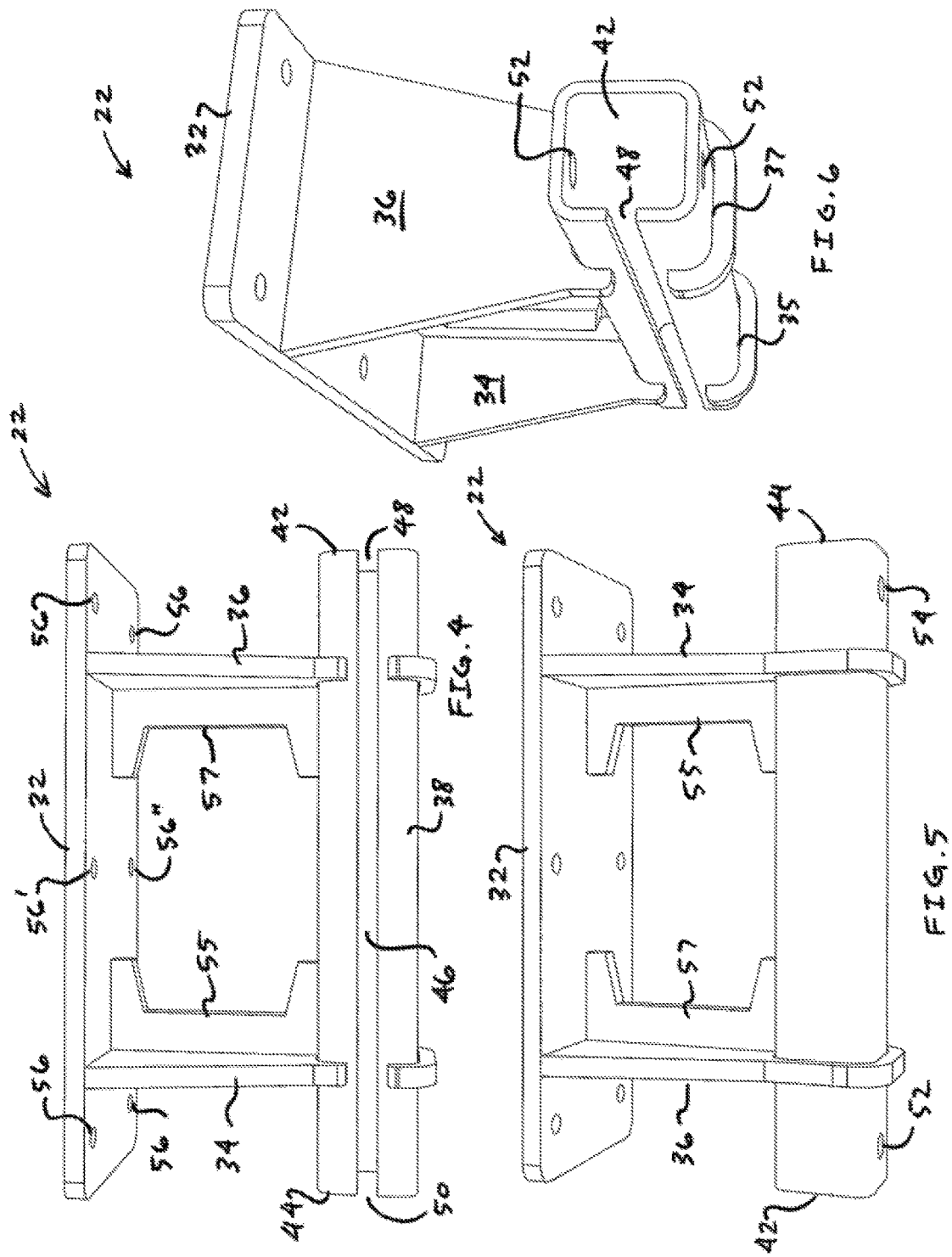

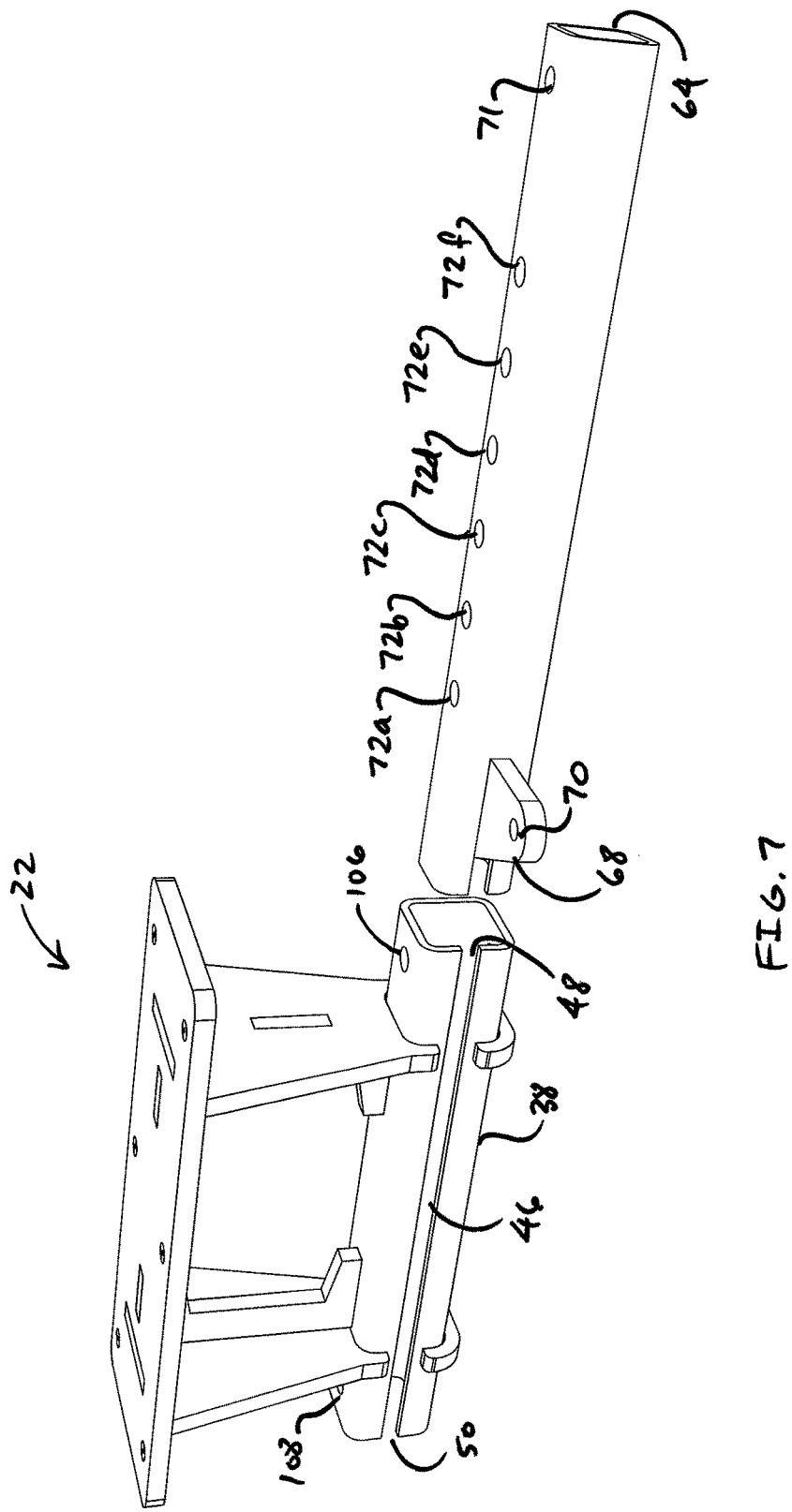

WAKE MODIFYING DEVICE FOR ATTACHMENT TO A STERN MOUNTED PLATFORM

RELATED APPLICATION DATA

This application claims the priority date of provisional application No. 62/110,167 filed on Jan. 30, 2015, which is herein incorporated by reference in its entirety.

BACKGROUND

In the sport of wake surfing (surfing on the wake of a moving boat) it is a desire to create a wave akin to naturally occurring waves that are surfed. A boat, however, creates a churning and choppy flow of water that converges from the aft of the boat. For wake surfing, it is a desire to have a less turbulent flow of trailing water along one side of the boat, approximately several feet high and occurring ten to fifteen feet aft of the stern.

Current designs are often custom-designed for a specific boat. Many require drilling though the hull of the vessel, potentially compromising the hull. Often these devices are permanently mounted and require various motors and control equipment to operate. A design is needed that is easy to adapt to multiple boats, without requiring complicated controls or attachment through the hull.

SUMMARY

The present wake modifying device is designed to be quickly and easily attached or detached from beneath the swim platform extending from the stern of the boat. Further, the unique design of the connection between the mount and the wake tab assembly enables the present device to be mounted to the swim platform, or other appropriate surface at the stern of the boat, on either the port or starboard side. The mount can be simply shifted between port and starboard without a change orientation. In one example, two similarly designed mounts may be mounted on each side. The wake tab assembly is also mountable to the mount on either side of the boat by rotating the wake tab assembly 180 degrees.

The wake modifying device may be comprised of a mount and a wake tab assembly, further comprising a lateral adjustment arm, an angular adjustment arm, and a wake tab. The mount has a base plate configured for attachment to an underside of the platform and a tube connected with the base plate and having a wall, a first open end, a second open end, and a longitudinal slot formed through the wall and extending along at least a portion the length, the longitudinal slot opening at the first open end. The lateral adjustment arm is insertable into the tube through the first open end and is fastenable to the tube, and the lateral adjustment arm has a first portion including a first end and a second portion including a second end. The wake tab is pivoted to the second portion of the lateral adjustment arm, where the lateral adjustment arm holds the wake tab at a selected distance from the mount. The angular adjustment arm connectively spans between the lateral adjustment arm and the wake tab, where the angular adjustment arm is pivoted to the first portion of the lateral adjustment arm at an end and pivoted to the wake tab at an opposite end, where the angular adjustment arm holds an angular position of the wake tab. The wake tab assembly is detachable from the mount by sliding the lateral adjustment arm out of the tube, and the wake tab assembly is attachable to the mount by sliding the lateral adjustment arm into the tube.

Alternatively, the longitudinal slot may extend from the first open end to the second open end, opening at the second open end. Further, the lateral adjustment arm may be insertable into the tube through either the first end or the second. The mount may be attachable to the underside of the platform near either a starboard side or a port side of the boat; where the lateral adjustment arm may be insertable into the tube through the first open end when the mount is attached to the starboard side, and may be insertable into the tube through the second open end when the mount is attached to the port side. The wake tab assembly may be rotated to an opposite orientation when moved from the starboard side to the port side, where the lateral adjustment arm may be aligned with the first open end of the tube when mounting on the starboard side and the lateral adjustment arm may be aligned with the second open end of the tube when mounting on the port side.

As an alternative, the first portion of the lateral adjustment arm may further comprise a hinge mounting tab extends radially from first portion of the lateral adjustment arm, where the angular adjustment arm is pivoted to the hinge mounting tab, and the hinge mounting tab protrudes through the longitudinal slot when the lateral adjustment arm is inserted into the tube. Further, a slot first opening at the first open end of the tube may be configured to receive the hinge mounting tab when the lateral adjustment arm is inserted into the tube through the first open end. Again alternatively, the longitudinal slot extends from the first open end to the second open end, opening at the second open end, a slot second opening at the second open end of the tube receives the hinge mounting tab when the lateral adjustment arm is inserted into the tube through the second open end.

Further alternatively, part of a hinge assembly may extend through the slot when the lateral adjustment arm is inserted into the tube. The angular adjustment arm may comprise a first tube telescopically inserted into a second tube, where the first tube can be selectively fastenable to the second tube to increase or decrease the length of the angular adjustment arm. The mount may further comprise a bracket extending from the base plate, with the tube being attached to the bracket.

In yet another option, wake modifying device may comprise a mount, a lateral adjustment arm, a wake tab, and an angular adjustment arm. The mount has a receiving portion with an open channel. The lateral adjustment arm is slidably received into the open channel of the receiving portion and selectively locked to the receiving portion, with the lateral adjustment arm having a first portion including a first end and a second portion including a second end. The wake tab is pivoted to the second portion of the lateral adjustment arm, with the lateral adjustment arm holding the wake tab at a selected distance from the mount. The angular adjustment arm connectively spans between the lateral adjustment arm and the wake tab, with the angular adjustment arm being pivoted to the first portion of the lateral adjustment arm at an end and pivoted to the wake tab at an opposite end, where the angular adjustment arm holds an angular position of the wake tab.

As an option, the open channel of the receiving portion may provide clearance for a connecting portion between the lateral adjustment arm and the angular adjustment arm. The connecting portion is a hinge mounting tab extending from the lateral adjustment arm with the angular adjustment arm being pivoted to the hinge mounting tab. The open channel can be partially enclosed by a flange for capturing the lateral adjustment arm within the open channel. And, the open channel can be an elongated open channel. The lateral adjustment arm, the angular adjustment arm, and the wake tab comprise the wake tab assembly, where the wake tab assembly is detachable from the mount by sliding the lateral adjustment arm out of the open channel of the receiving portion, and the wake tab assembly is attachable to the mount by sliding the lateral adjustment arm into the tube. As yet another option, the lateral adjustment arm can be locked to the open channel in a plurality of lateral positions located by sliding the lateral adjustment arm axially within the open channel. The wake tab further comprises a transom plate contoured to closely match a transom contour of the stern of the boat, where the transom plate can be attached parallel to and atop the wake tab, and the transom plate is slidable relative to the wake tab to reduce a gap between the transom plate and a transom of the boat.

BRIEF DESCRIPTION OF THE SEVERAL VIEWS OF THE DRAWINGS

FIG. 4 is a rear perspective view of the present mount;

FIG. 5 is a front perspective view of the present mount;

FIG. 6 is a side perspective view of the present mount;

FIG. 7 is a rear exploded perspective view of the present mount with the lateral adjustment arm in line with the first open end of the mount and ready for attachment;

LISTING OF REFERENCE NUMERALS of FIRST-PREFERRED EMBODIMENT

Figure 1:
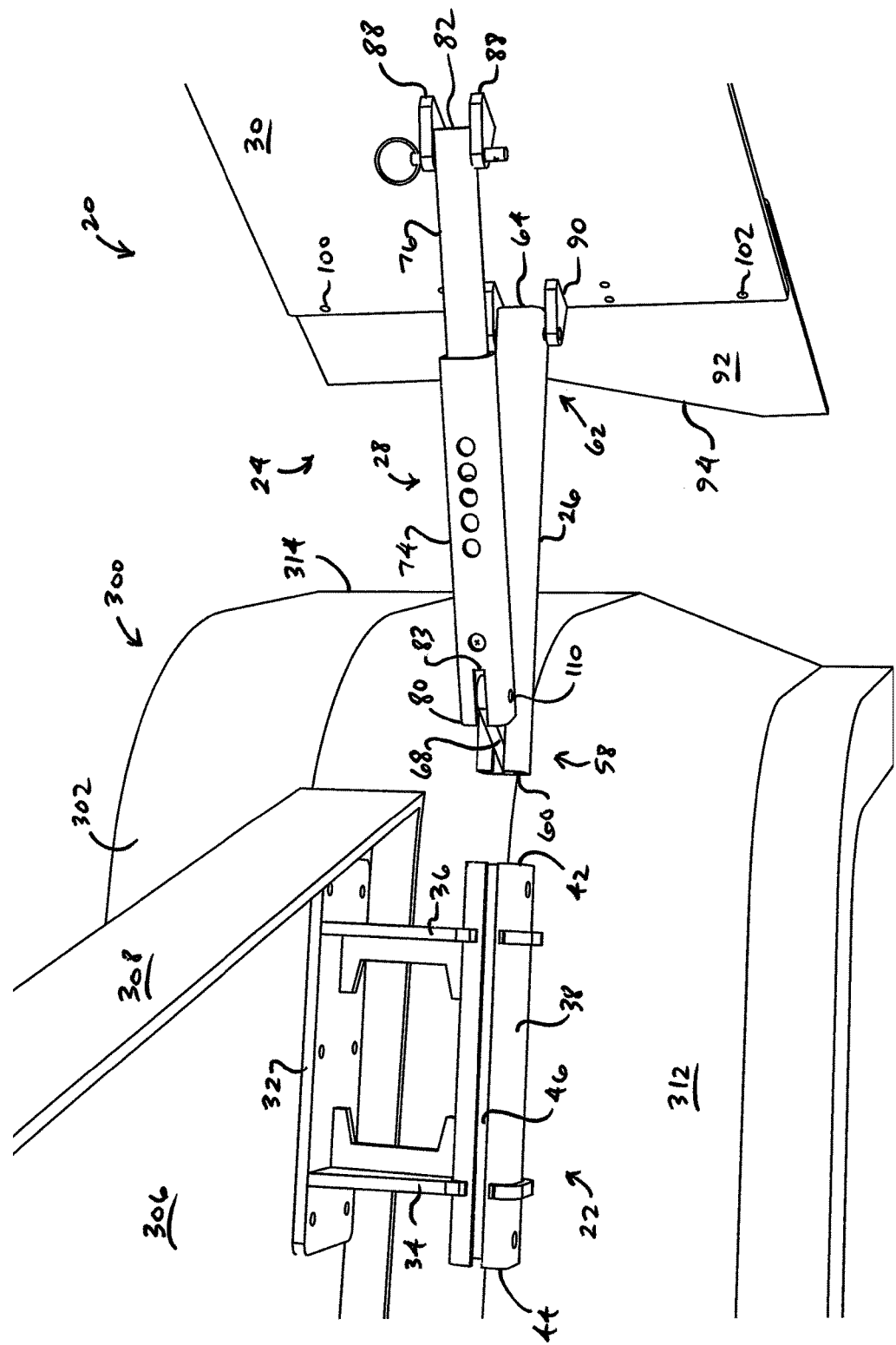
FIG. 1 is a rear exploded perspective view of an example embodiment of the present wake modifying device, showing the wake tab assembly in line with the mount and ready for attachment.

| | |
|---|---|
| wake modifying device | 20 |
| mount | 22 |
| wake tab assembly | 24 |
| lateral adjustment arm | 26 |
| angular adjustment arm | 28 |
| wake tab | 30 |
| base plate | 32 |

-continued

| | |
|---|---|
| bracket | 34, 36 |
| holding portion | 35, 37 |
| tube (receiving portion) | 38 |
| wall | 40 |
| first open end | 42 |
| second open end | 44 |
| longitudinal slot (open channel) | 46 |
| slot first opening | 48 |
| slot second opening | 50 |
| quick release pin hole | 52, 54 |
| bolt hole | 56, 56', 56" |
| lateral brace | 55, 57 |
| first portion | 58 |
| first end | 60 |
| second portion | 62 |
| second end | 64 |
| connecting portion | 66 |
| hinge tab | 68 |
| quick release pin hole | 70, 71, 106, 108, 110 |
| adjustment hole | 72a-f |
| base segment (second tube) | 74 |
| extending segment (first tube) | 76 |
| adjustment hole | 78a-e |
| end | 80 |
| opposite end | 82 |
| clevis | 83 |
| quick release pin hole | 84 |
| stowage pin hole | 85 |
| quick release pin hole | 86 |
| adjustment holes | 87a-e |
| hinge tab pair | 88 |
| hinge tab pair | 90 |
| transom plate | 92 |
| transom plate edge | 94 |
| adjustment slot | 96, 98 |
| fastener hole | 100, 102 |
| wake device | 200 |
| mounting plate | 202 |
| angular adjustment arm | 204 |
| hinge | 206 |
| hinge | 208 |
| wake tab | 210 |
| hinge | 212 |
| brace plate | 214 |
| adjustment plate | 216 |
| upper extension | 218 |
| lower extension | 220 |
| strap | 222 |
| transom plate | 224 |
| boat | 300 |
| stern | 302 |
| platform | 304 |
| underside | 306 |
| upper side | 307 |
| side wall | 308 |
| transom | 310 |
| transom contour | 312 |
| starboard side | 314 |

DESCRIPTION OF THE PREFERRED EMBODIMENTS

The detailed descriptions set forth below in connection with the appended drawings are intended as a description of embodiments, and is not intended to represent the only forms in which the present securement system may be constructed and/or utilized. The descriptions set forth the structure and the sequence of steps for constructing and operating the securement system in connection with the illustrated embodiments. It is to be understood, however, that the same or equivalent structures and steps may be accomplished by different embodiments that are also intended to be encompassed within the spirit and scope of the invention.

An example embodiment of the present wake modifying device is illustrated in FIGS. 1-11. Looking first at FIG. 1, the mount (22) is bolted to the underside (306) of a swim platform (304) extending from the transom or stern (302) of a boat (300), with the wake tab assembly (24) shown adjacent to the mount (22) and aligned for insertion into the mount (22). The lateral adjustment arm (26) is configured to slidably insert into the tube or receiving portion (38) of the mount (22), and lock the two together into a selected position by inserting a quick release pin through one of several holes. In this way, the wake tab assembly (24) can be selectively locked to the mount (22). As will be discussed in further detail below, the receiving portion (38) of the mount (22) and the mating lateral adjustment arm (26) are complementarily designed to permit the mounting of the wake tab assembly (24) on either the port or starboard side of the boat (300), and to permit the quick attachment and detachment of the wake tab assembly (24).

The exemplary mount (22) attaches to the underside (306) through a base plate (32) with a plurality of through holes which align with though holes in the swim platform (304), and are suitable for receiving bolts through both the base plate (32) and the swim platform (304) for bolting the base plate (32) to the swim platform (304), thus securing the mount (22) to the boat (300). A first bracket (34) and a second bracket (36) extend from the mounting plate (32) to support the receiving portion (38), a tube in this case. Although, the term "tube" is used, this does not limit the shape of the tube to a round cross-section. When looking at FIGS. 4-6, it can be seen that the receiving portion (38) has a square-like cross-section, which provides support to prevent rotation of the lateral adjustment arm (26) relative to the mount (22). A longitudinal slot (46) is formed through the wall of the receiving portion (38), creating an open channel. Although the longitudinal slot (46) is shown extending from the first open end (42) to the second open end (44), the longitudinal slot could extend from the first open end (42) and terminate at a point along the length of the receiving portion (38). It is preferred that the longitudinal slot (46) extend the entire length of the receiving portion (38) so that the wake tab assembly (24) can be inserted on either side of the mount (22).

To strengthen the mount (22) in the lateral direction, lateral braces (55, 57) each abut their respective bracket (34, 36). Quick release pin holes (52, 54) are drilled completely through the receiving portion (38) near the first open end (42) to the second open end (44) respectively. The brackets (34, 36) are designed to position the receiving portion (38) beyond any obstructions of the swim platform (304), such as the side wall (308), and to correctly position the wake tab assembly (24) relative to the boat (300). However, the brackets (34, 36) may not be necessary, depending on the design of the swim platform (304) and other design requirements. Because the mounting plate (32) enables the attachment of the mount (22) to the underside (306) of the swim platform (304) or other platform extending from the stern (302) of a boat (300), the present wake modifying device (20) does not need to be bolted or attached to the hull of the boat (300) itself, reducing the chance of compromising the hull integrity.

The wake tab assembly (24) is selectively attachable and detachable from the mount (22), which allows the assembly (24) to be stowed when not in use to reduce the effect the wake tab (30) may have on the normal operation of the boat (300) and to prolong the life of the assembly (24) by removal when not in use. The wake tab assembly (24) has a wake tab (30) that is adjustable both laterally and angularly relative to the mount (22) and the boat (300). The lateral adjustment is provided by the lateral adjustment arm (26); and the angular adjustment is provided by the angular adjustment arm (28).

In the illustrated example, the lateral adjustment arm (26) provides the sole attachment point between the wake tab assembly (24) and the mount (22). The angular adjustment arm (28) hinges to the first portion (58) of the lateral adjustment arm (26), near the first end (60) of the lateral adjustment arm (26) by a connecting portion. A hinge tab (68) forms part of the connecting portion and extends outwardly or radially (or extends from another appropriate orientation) from the lateral adjustment arm (26). The base segment or second tube (74) hinges to the hinge tab (68) by the end (80) through a clevis coupler, where a quick release pin or other hinge pin (not shown) inserts through quick release pin holes (110 and 71), to rotatably fasten the angular adjustment arm (28) to the lateral adjustment arm (26).

The longitudinal slot or open channel (46) is positioned and sized to receive the connecting portion (66) between the lateral adjustment arm (26) and the angular adjustment arm (28). In this example, the connecting portion is the hinge tab (68) and the clevis (83). However, the connecting portion (66) could be any number of means that connects the lateral adjustment arm (26) and the angular adjustment arm (28) through a hinge. For example, a hinge tab could protrude from the base segment (74) of the angular adjustment arm (28) and connect to a clevis on the lateral adjustment arm (26).

In this example, the longitudinal slot (46) receives the hinge tab (68), providing clearance for the hinge tab (68) so that the lateral adjustment arm (26) hinged with the angular adjustment arm (28) can be inserted into the receiving portion (38) and slide laterally along the length of the receiving portion (38) with minimal or no mechanical interference. As illustrated in FIG. 1 (and referring to FIG. 4), the first end (60) of the lateral adjustment arm (26) is inserted into the first open end (42) of the receiving portion (38), with the hinge tab (68) being inserted into the slot first opening (48). With this arrangement, the longitudinal slot (46) provides clearance so that the hinge tab (68) slides laterally within the slot (46). The receiving portion (38) is shown as a continuous tube here; however, other variations are possible such as two tubular sections joined by a rail that permits lateral travel of the lateral adjustment arm (26). The illustrated example is preferred, as the continuous tube (38) with the longitudinal slot (46) provides structural support for the lateral adjustment arm (26) along a plurality of discrete lateral positions. Additionally, the longitudinal slot (46) may also serve as a further support to prevent rotation of the lateral adjustment arm (26) relative to the mount (22), by arresting rotational movement of the hinge tab (68).

The angular adjustment arm (28) is shown as a telescoping linkage with a base segment or second tube (74) and an extending segment or first tube (76) (or rod) inserted telescopically within the base segment (74). As described above, the end (80) of the base segment (74) hinges on the first portion (58) of the lateral adjustment arm (26), in this example on the hinge tab (68). The second end (82) of the extending segment (82) hinges on the hinge tab pair (88) extending from the wake tab (30), being held in place by the quick release pin (104) or other hinge pin. The angle of the wake tab (30) relative to the mount (22) can be adjusted by axially sliding the extending segment (76) into and out of the base segment (74), locking the two together at discrete positions in any one of the adjustment holes (87a-e) by insertion of a pin, such as a quick release pin.

As the extending segment (76) is adjusted into or out of the base segment (74), the wake tab (30) hinges about the second end (64) or second portion (62) of the lateral adjustment arm (26) on hinge tab pair (90), while the angle between the wake tab (30) and the angular adjustment arm (28) increases or decreases accordingly. The wake tab (30) may be set at an approximate right angle to the lateral adjustment arm (26) when it is desired that the wake modifying device (20) provide little or no wake modification. In another mode, the wake tab (30) may be set at an obtuse angle to the lateral adjustment arm (26) when it is desired that the wake modifying device (20) provide wake modification. Although it is shown that discrete angles are possible through use of the adjustment holes (87a-e), other locking means are possible, such as frictional locks, cam locks, collar locks, and the like. Furthermore, the angular adjustment arm (28) could slidably adjust using a non-telescoping means, such as two bars held together by rings or collars and allowed to slide relative to one another.

Figure 3:
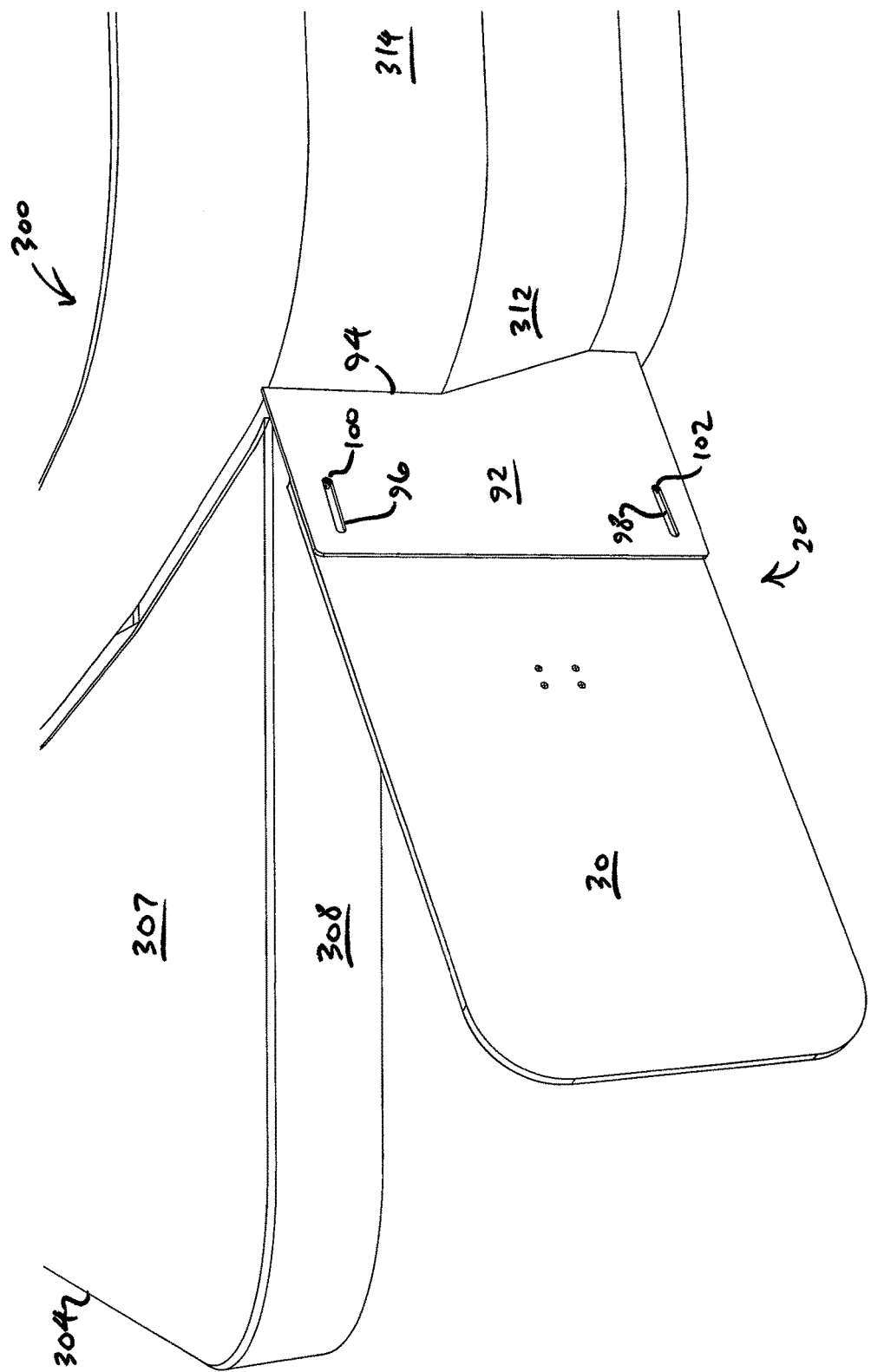
FIG. 3 is a side perspective view of the embodiment of FIG. 1, showing the wake tab swung outwardly from the swim platform.

The wake plate (30) may have a transom plate (92), preferably made of a flexible material such as rubber. Referring to FIG. 3, the transom plate (92) is attached to the wake tab (30), laid atop the wake tab (30), and is adjustable and lockable using fasteners inserted through the corresponding adjustment slots (96, 102) and fastener holes (100, 102). The transom plate (92) has a transom plate edge (94) that may be cut to closely match the shape of the boat transom (312). The transom plate (92) can be moved towards the transom (312) to create a seal between the transom plate edge (94) and the transom (312) or other portion of the boat (300) hull. The transom plate (92) may be made of alternate materials, such as plastic, aluminum, and so on. When using a rigid material to make the transom plate (92), the edge (94) may include a rubber skirt or other gasket to create a seal between the transom plate edge (94) and the transom (312), to insure proper water flow about the wake plate (30). The transom plate (92) may be pre-cut to fit a particular boat model, or may be cut by the end user to his or her particular boat model.

FIGS. 4-6 illustrate an example embodiment of the mount (22) is closer detail. The exemplary mount (22) structurally and functionally symmetrical about an axis approximately formed through bolt holes (56' and 56"). This means that the mount (22) can function similarly whether mounted to the port or starboard side of the boat (300). This symmetry does not necessarily mean that each side of the mount (22) is visually similar on either side of the axis. The brackets (34, 36) extending from the base plate (32) each have a C-shaped holding portion (35, 37) which mostly encloses and support the tube (38). The bracket can be made of a number of materials, such as stainless steel, anodized aluminum, or other structurally sufficient material. When using aluminum or steel, the various parts of the mount (22) can be welded together. Additionally, mortice and tenon type joints may be used between the mount parts to increase the strength of the welded mount (22). Anodized aluminum is generally preferred for many of the parts of the wake tab assembly (24) due to the material's lightweight and corrosion resistant properties.

Figure 2:
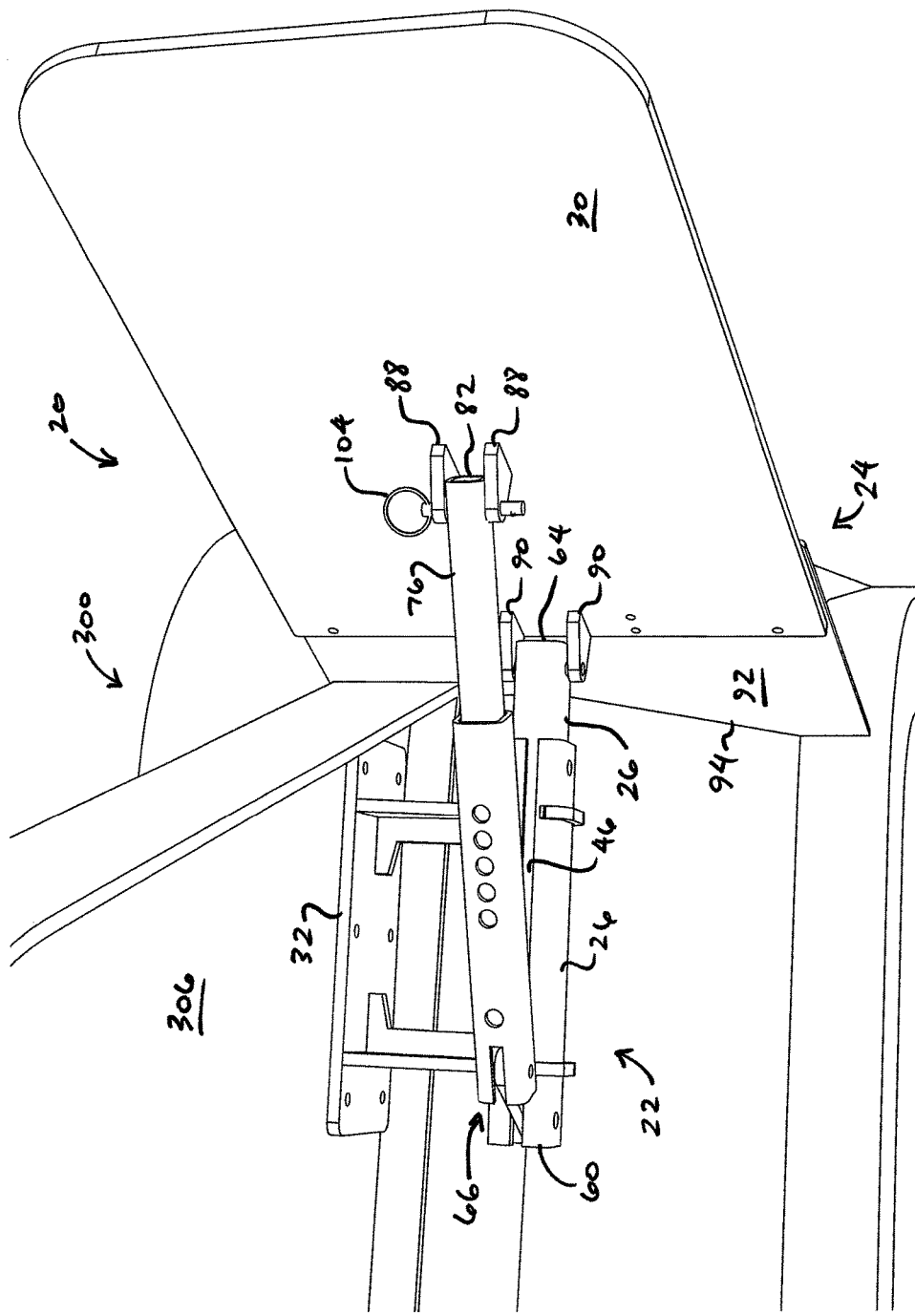
FIG. 2 is a rear perspective view of the embodiment of FIG. 1, showing the wake tab assembly attached to the mount, beneath the swim platform of a boat.

FIG. 7 shows the lateral adjustment arm (26) in position to be inserted into the first open end (42) of the receiving portion (42), when the mount (22) is attached towards the starboard (314) side of the boat (300), as shown in FIGS. 1-2. A quick release pin (not shown) may be inserted through hole (106) and through any one of holes (72a-f) to lock the lateral adjustment arm (26) in any one of six positions, although more or less positions are possible, depending on the number of holes. Hinge tab (68) readily slides into the longitudinal slot (46) through the slot first opening (48), with the longitudinal slot (46) providing clearance along the entire length of the tube (38) so that the lateral adjustment arm (26) can be slid through the tube (38) and fastened at any one of the adjustment holes (72a-f).

Figure 8:
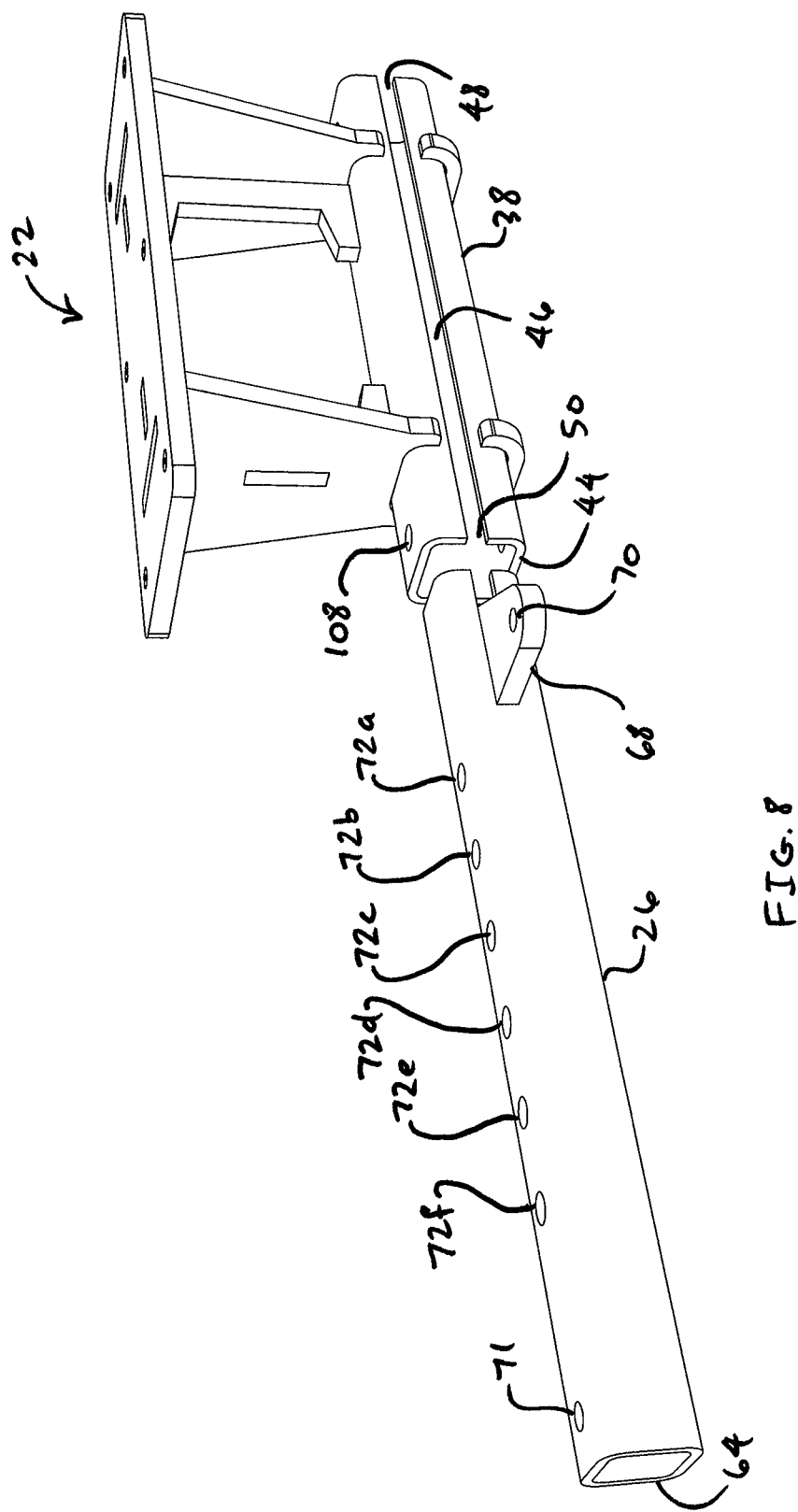
FIG. 8 is a rear exploded perspective view of the present mount with the lateral adjustment arm in line with the second open end of the mount and ready for attachment.

FIG. 8 shows the lateral adjustment arm (26) in position to be inserted into the second open end (44) of the receiving portion (42), when the mount (22) is attached towards the port side of the boat (300) (not shown). In this case, the mount (22) is still fastened to the underside (306) of the platform (304), except on the port side. A quick release pin (not shown) may be inserted through hole (108) and through any one of holes (72a-f) to lock the lateral adjustment arm (26) in any one of six positions. Hinge tab (68) readily slides into the longitudinal slot (46) through the slot second opening (50), with the longitudinal slot (46) providing clearance along the entire length of the tube (38) so that the lateral adjustment arm (26) can be slid through the tube (38) and fastened at any one of the adjustment holes (72a-f).

When comparing FIG. 7 to FIG. 8, it can be seen that the lateral adjustment arm (26) (and, this, the entire wake tab assembly) need only to be rotated 180 degrees to position the wake tab (30) on either the port or starboard side of the boat (300). In one usage example, two mounts (22) can be attached to the underside (306) of the platform (304), one on each side of the boat (300). The wake tab assembly (24) can be used on either mount (22), with the lateral adjustment arm (26) inserted into the first open end (42) when the wake tab is positioned on the starboard side and the lateral adjustment arm (26) inserted into the second open end (44) when the wake tab is positioned on the port side. The wake tab assembly (24) can be easily switched from port to starboard by reaching beneath the platform (304), detaching the wake tab assembly (24) from the port mount, rotating the wake tab assembly (24), and inserting it into the starboard mount by reach beneath the platform (304).

Figure 9:
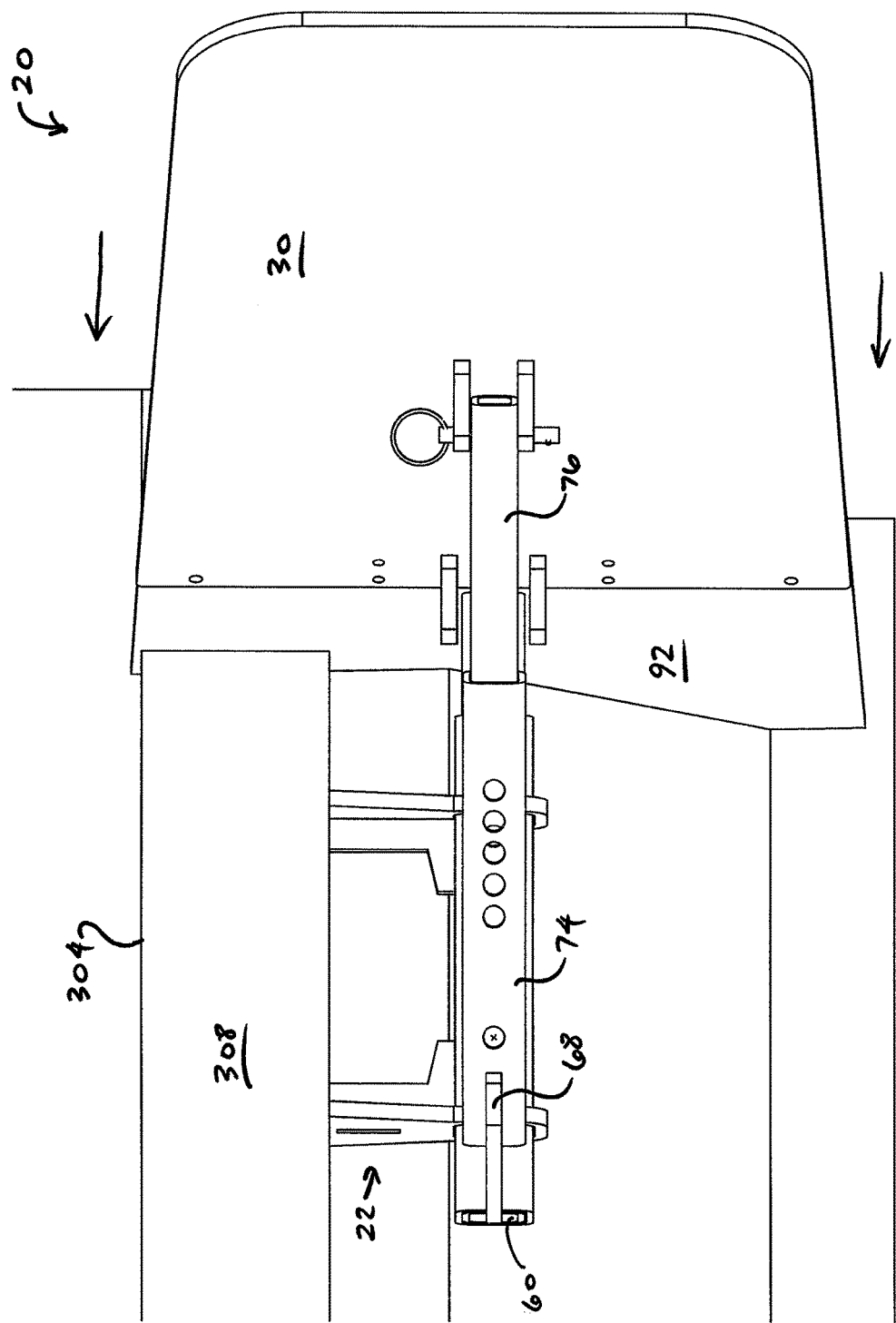
FIG. 9 is a rear plan view of the embodiment of FIG. 1, showing the wake tab laterally adjusted toward the swim platform.
Figure 10:
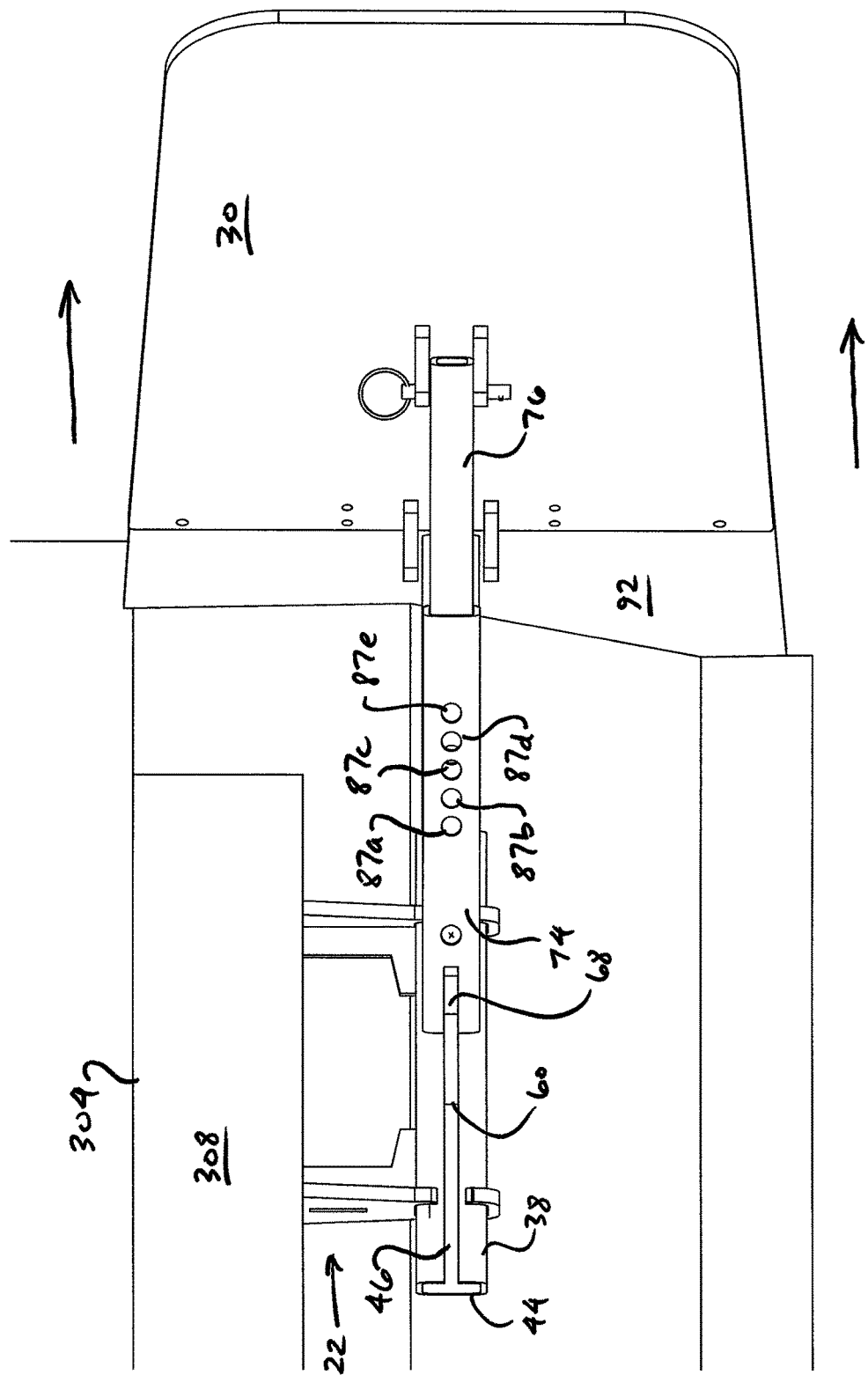
FIG. 10 is a rear plan view of the embodiment of FIG. 1, showing the wake tab laterally adjusted away from the swim platform.
Figure 11:
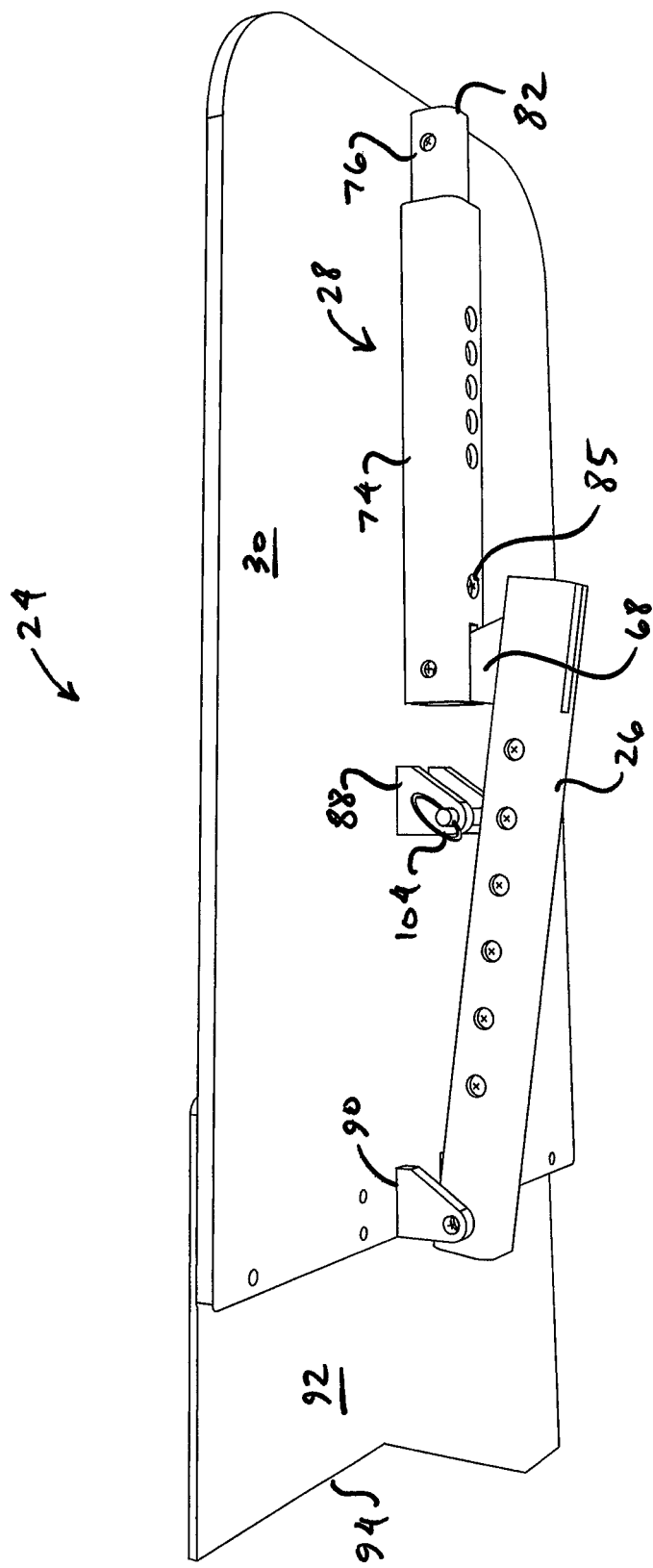
FIG. 11 is a perspective view of the wake tab assembly detached from the mount, folded, and ready for stowage.

FIGS. 9 and 10 show the extent of the lateral adjustment of the wake tab (30) available by sliding the lateral adjustment arm (26) within the receiving portion (38). FIG. 9 shows the wake tab (30) moved towards a maximum inboard position, as shown by the inboard-pointing arrows. FIG. 10 shows the wake tab (30) moved towards a maximum outboard position, as shown by the outboard-pointing arrows.

As briefly discussed above, the wake tab assembly (24) can be detached from the mount (22) so that the wake tab assembly (24) can be folded in a compact arrangement for stowage. To fold the wake tab assembly (24), the pin (104) is pulled from the hinge tab pair (88) on the wake plate (30) to release the end (82) of the angular adjustment arm (28). Thereafter, the angular adjustment arm (28) can be extended outward from the lateral adjustment arm (26) to closely lie against the wake tab (30). A pin may be inserted through the stowage pin hole (85) to prevent the extending segment (76) from sliding out of the base segment (74). In this folded configuration, the wake tab assembly (24) can be inserted into a protective cover and easily stowed within the boat (300).

Figure 12:
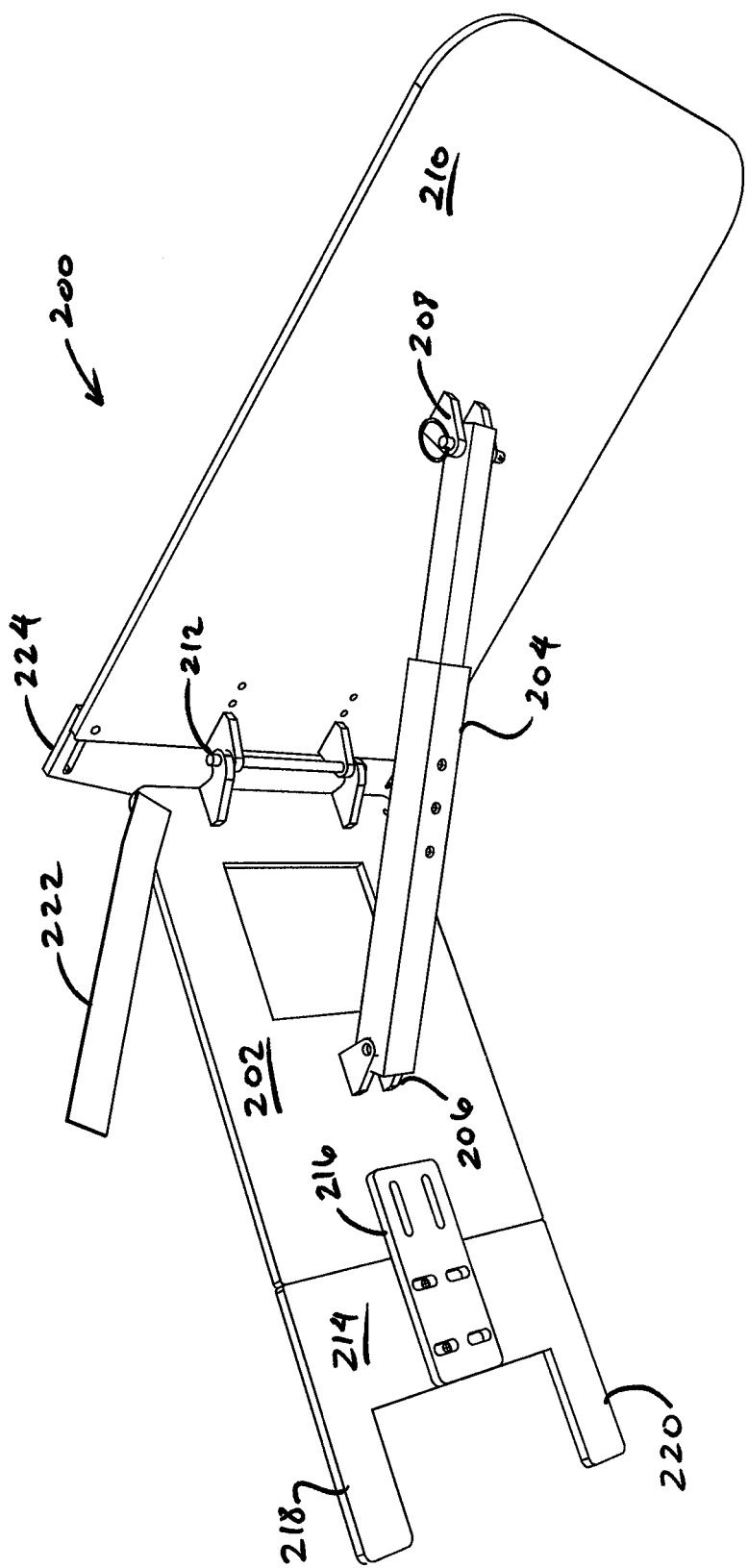
FIG. 12 is a rear perspective view of an alternate embodiment of the present wake modifying device.
Figure 13:
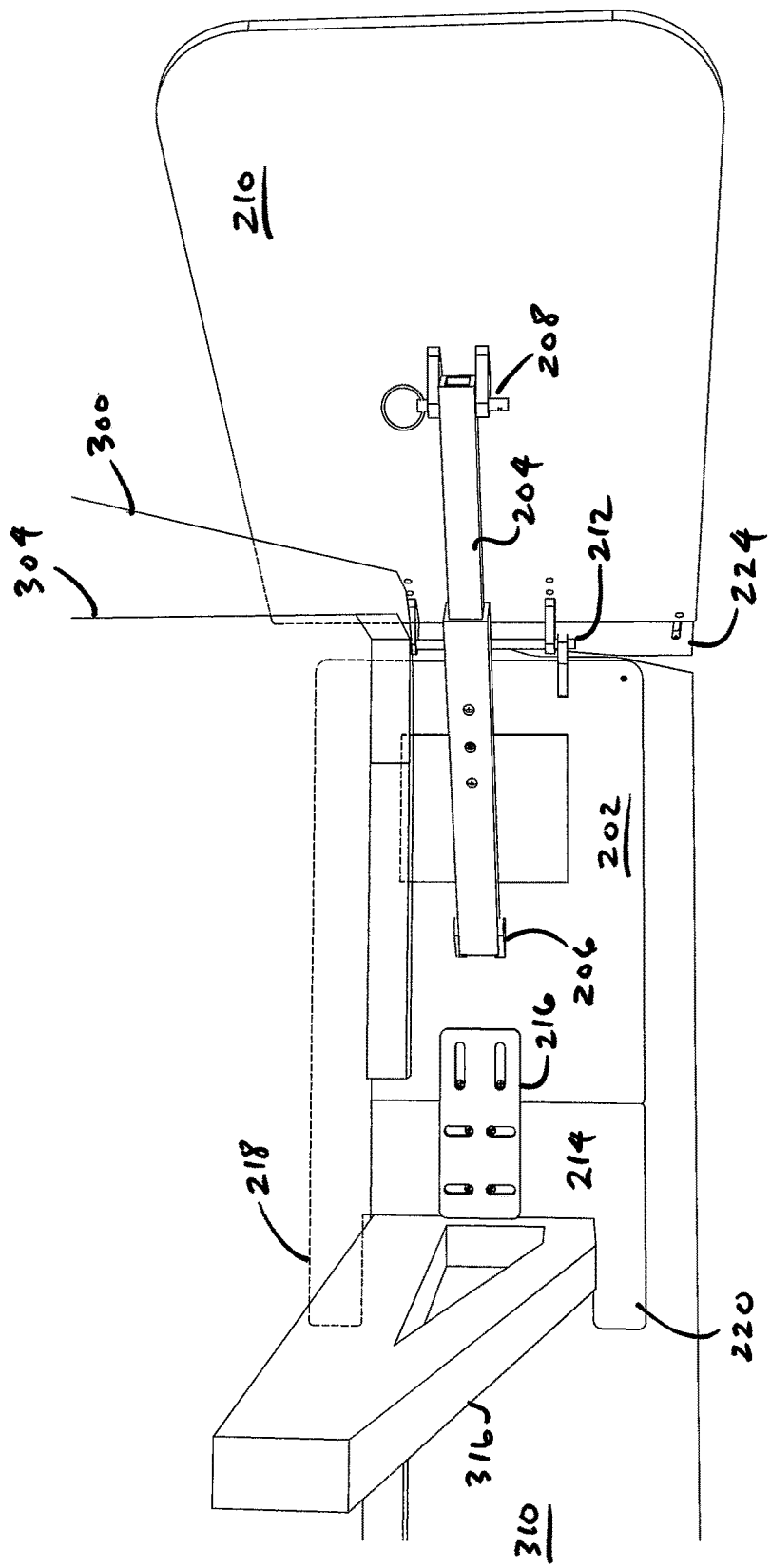
FIG. 13 is a rear perspective view of the embodiment of FIG. 13, showing the wake modifying device attached between the transom of the boat and the swim platform.
Figure 14:
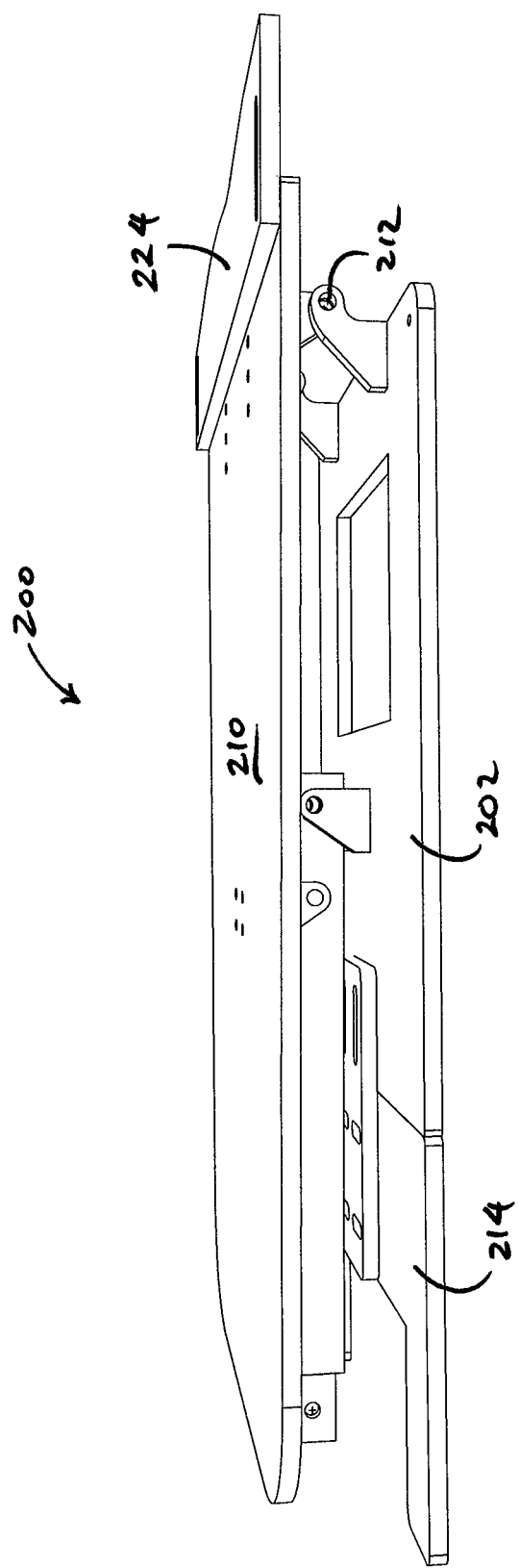
FIG. 14 is a perspective view of the of the embodiment of FIG. 13, showing the wake modifying device detached from the boat, folded, and ready for stowage.

FIGS. 12-14 show an alternate embodiment of a wake tab assembly (200), where the wake tab assembly (200) is wedged and fastened between the boat transom (312) and the swim platform (304), rather than employing a mount. The wake tab (210) is rotatably attached to mounting plate (202) through hinge (212). An angular adjustment arm (204) extends from a hinge (206) on the mounting plate (202) to a hinge (208) on the wake tab (210), such that when the angular adjustment arm (204) is telescopically extended or contracted, the wake tab (210) changes angle relative to the mounting plate (202). The wake tab (210) includes a transom plate (224), which is configured to seal against the transom (312) of the boat (300).

Attached to the mounting plate (202) is an adjustable bracing plate (214) with an upper extension (218) and a low extension (220). The adjustable bracing plate (214) is attached to the mounting plate (202) through an adjustment plate (216) which allows for adjustment of the bracing plate's position relative to the mounting plate (202) using a series of vertical and horizontal slots through which the position may be held by tightened bolts or other fasteners. A foam rubber sheet (not shown) is adhered to one or both sides of the mounting plate (202) and, optionally, the bracing plate (214), preferably covering a large area of the mounting plate (202). Further a strap (222) is attached to the mounting plate (202), to optionally strap the wake device (200) to a portion of the boat (300), such as a U-bolt on the transom (312).

The wake device (200) is shown mounted to a boat (300), with the mounting plate (202) inserted between the platform (304) and the transom (310). The foam rubber sheet is located between the transom (310) and the mounting plate (202) such that the foam rubber sheet is compressed to provide a frictional engagement between the sheet and the transom (310) to at least partially hold the wake device (200) to the boat (300). The brace plate (214) is adjusted relative to the mounting plate (202) so that the upper extension (218) is positioned above the platform bracket (316) and the lower extension (220) is positioned under the platform bracket (316) to further aid in bracing the wake device (200) and hold it in position on the transom (310).

The wake device (200) can be removed from the boat (300) and folded, as shown in FIG. 14. To fold the wake device (200), the hinge (208) connecting the angular adjustment arm (204) to the wake tab (210) is separated by removing the pin. Thereafter, the wake device (200) can be folded over to a compact configuration suitable for stowage.

While particular forms of the present securement system have been illustrated and described, it will also be apparent to those skilled in the art that various modifications can be made without departing from the spirit and scope of the design. Accordingly, it is not intended that the invention be limited except by the claims.

What is claimed is:

1. A wake modifying device for attachment to a platform protruding from a stern of a boat, the wake tab comprising:
    a mount comprising a base plate configured for attachment to an underside of the platform and a tube connected with the base plate and having a wall, a first open end, a second open end, and a longitudinal slot formed through the wall and extending along at least a portion the length, the longitudinal slot opening at the first open end; and
    a wake tab assembly comprising:
        a lateral adjustment arm that is insertable into the tube through the first open end and is fastenable to the tube, the lateral adjustment arm having a first portion including a first end and a second portion including a second end;
        a wake tab pivoted to the second portion of the lateral adjustment arm, the lateral adjustment arm holding the wake tab at a selected distance from the mount; and
        an angular adjustment arm connectively spanning between the lateral adjustment arm and the wake tab, the angular adjustment arm being pivoted to the first portion of the lateral adjustment arm at an end and pivoted to the wake tab at an opposite end, the angular adjustment arm holding an angular position of the wake tab;
    wherein the wake tab assembly is detachable from the mount by sliding the lateral adjustment arm out of the tube, and the wake tab assembly is attachable to the mount by sliding the lateral adjustment arm into the tube.

2. The wake modifying device of claim 1 wherein the longitudinal slot extends from the first open end to the second open end, opening at the second open end.

3. The wake modifying device of claim 2 wherein the lateral adjustment arm is insertable into the tube through either the first end or the second.

4. The wake modifying device of claim 3 wherein the mount is attachable to the underside of the platform near either a starboard side or a port side of the boat, the lateral adjustment arm is insertable into the tube through the first open end when the mount is attached to the starboard side, and the lateral adjustment arm is insertable into the tube through the second open end when the mount is attached to the port side.

5. The wake modifying device of claim 4 wherein the wake tab assembly is rotated to an opposite orientation when moved from the starboard side to the port side, where the lateral adjustment arm is aligned with the first open end of the tube when mounting on the starboard side and the lateral adjustment arm is aligned with the second open end of the tube when mounting on the port side.

6. The wake modifying device of claim 1 wherein the first portion of the lateral adjustment arm further comprises a hinge mounting tab extends radially from first portion of the lateral adjustment arm, the angular adjustment arm being pivoted to the hinge mounting tab, and the hinge mounting tab protruding through the longitudinal slot when the lateral adjustment arm is inserted into the tube.

7. The wake modifying device of claim 6 wherein a slot first opening at the first open end of the tube receives the hinge mounting tab when the lateral adjustment arm is inserted into the tube through the first open end.

8. The wake modifying device of claim 7 wherein the longitudinal slot extends from the first open end to the second open end, opening at the second open end, a slot second opening at the second open end of the tube receives the hinge mounting tab when the lateral adjustment arm is inserted into the tube through the second open end.

9. The wake modifying device of claim 1 wherein a part of a hinge assembly extends through the slot when the lateral adjustment arm is inserted into the tube.

10. The wake modifying device of claim 1 wherein the angular adjustment arm comprises a first tube telescopically inserted into a second tube, the first tube being selectively fastenable to the second tube to increase or decrease an angular adjustment arm length.

11. The wake modifying device of claim 1 wherein the mount further comprises a bracket extending from the base plate, the tube being attached to the bracket.

12. A wake modifying device for attachment to a platform protruding from a stern of a boat, the platform having an underside configured to face the water, the wake tab comprising:
    a mount with a receiving portion having an open channel;
    a lateral adjustment arm that is slidably received into the open channel of the receiving portion and selectively locked to the receiving portion, the lateral adjustment arm having a first portion including a first end and a second portion including a second end;

a wake tab pivoted to the second portion of the lateral adjustment arm, the lateral adjustment arm holding the wake tab at a selected distance from the mount; and an angular adjustment arm connectively spanning between the lateral adjustment arm and the wake tab, the angular adjustment arm being pivoted to the first portion of the lateral adjustment arm at an end and pivoted to the wake tab at an opposite end, the angular adjustment arm holding an angular position of the wake tab.

13. The wake modifying device of claim 12 wherein the open channel of the receiving portion provides clearance for a connecting portion between the lateral adjustment arm and the angular adjustment arm.

14. The wake modifying device of claim 13 wherein the connecting portion is a hinge mounting tab extending from the lateral adjustment arm with the angular adjustment arm being pivoted to the hinge mounting tab.

15. The wake modifying device of claim 12 wherein the open channel is partially enclosed by a flange for capturing the lateral adjustment arm within the open channel.

16. The wake modifying device of claim 12 wherein the open channel is an elongated open channel.

17. The wake modifying device of claim 12 wherein the lateral adjustment arm, the angular adjustment arm, and the wake tab comprise the wake tab assembly, the wake tab assembly being detachable from the mount by sliding the lateral adjustment arm out of the open channel of the receiving portion, and the wake tab assembly is attachable to the mount by sliding the lateral adjustment arm into the tube.

18. The wake modifying device of claim 12 wherein the lateral adjustment arm can be locked to the open channel in a plurality of lateral positions located by sliding the lateral adjustment arm axially within the open channel.

19. The wake modifying device of claim 12 wherein the wake tab further comprises a transom plate contoured to closely match a transom contour of the stern of the boat, the transom plate attached parallel to and atop the wake tab, the transom plate being slidable relative to the wake tab to reduce a gap between the transom plate and a transom of the boat.

* * * * *